(12) United States Patent
Yang et al.

(10) Patent No.: US 8,119,231 B2
(45) Date of Patent: Feb. 21, 2012

(54) TRANSPARENT BULLET-RESISTANT ACRYLIC SHEET

(75) Inventors: Shi-Jun Yang, Upper Dublin, PA (US);
 Richard M. Abel, Bensalem, PA (US);
 Jack J. Reilly, Blue Bell, PA (US);
 Elizabeth E. Grimes, Souderton, PA (US)

(73) Assignee: Arkema France, Colombes (FR)

( * ) Notice: Subject to any disclaimer, the term of this patent is extended or adjusted under 35 U.S.C. 154(b) by 343 days.

(21) Appl. No.: 11/911,044

(22) PCT Filed: Mar. 21, 2006

(86) PCT No.: PCT/US2006/010200
 § 371 (c)(1),
 (2), (4) Date: Oct. 9, 2007

(87) PCT Pub. No.: WO2007/044063
 PCT Pub. Date: Apr. 19, 2007

(65) Prior Publication Data
 US 2009/0123721 A1  May 14, 2009

Related U.S. Application Data

(60) Provisional application No. 60/670,438, filed on Apr. 12, 2005.

(51) Int. Cl.
 *B32B 5/16* (2006.01)
 *B28B 1/00* (2006.01)

(52) U.S. Cl. ........ 428/323; 428/220; 428/522; 264/165; 264/212

(58) Field of Classification Search ............ 428/220, 428/412, 500, 512
 See application file for complete search history.

(56) References Cited

U.S. PATENT DOCUMENTS

| | | | |
|---|---|---|---|
| 3,793,402 A * | 2/1974 | Owens | 525/81 |
| RE29,772 E | 9/1978 | Niederhauser et al. | |
| 4,198,468 A | 4/1980 | Molari | |
| 4,322,476 A | 3/1982 | Molari, Jr. | |
| 4,328,277 A | 5/1982 | Milari, Jr. | |
| 4,431,466 A | 2/1984 | MeLampy | |
| 4,505,972 A | 3/1985 | Moore et al. | |
| 4,594,290 A | 6/1986 | Fischer et al. | |
| 4,894,282 A | 1/1990 | LeGrand et al. | |
| 5,063,259 A * | 11/1991 | Wanat et al. | 523/201 |
| 5,747,159 A * | 5/1998 | Labock | 428/335 |
| 5,777,034 A * | 7/1998 | Shah et al. | 525/228 |
| 5,962,617 A | 10/1999 | Slagel | |
| 6,127,505 A | 10/2000 | Slagel | |
| 6,818,268 B2 | 11/2004 | Gonzalez | |
| 6,844,396 B2 * | 1/2005 | Sugaya et al. | 525/70 |
| 2003/0171491 A1 * | 9/2003 | Gaillard et al. | 525/227 |

OTHER PUBLICATIONS

"UL752 Paragraphs" Protective Structures, Ltd. Accessed May 18, 2009.*
"UL752 Specifications & Ammunitions Datasheet" Protective Structures, Ltd. Accessed May 18, 2009.*

* cited by examiner

*Primary Examiner* — David Sample
*Assistant Examiner* — Prashant J Khatri
(74) *Attorney, Agent, or Firm* — Thomas F. Roland

(57) ABSTRACT

The invention relates to a novel acrylic impact sheet having bullet-resistant properties. The bullet-resistant sheet is composed of a copolymer of methyl methacrylate and a $C_{2-18}$ alkyl methacrylate, plus impact modifiers that are refractive index matched or mismatched with the polymer matrix. The sheet provides very good bullet resisting performance, with better performance at the same thickness as current products, or the same performance at less thickness, thereby providing a product having better properties and/or less weight. The reduced weight of a bullet resistant acrylic sheet formulation will provide reduced raw material, transportation, and construction costs. Bullet resistant transparent glazing is an especially useful application for the invention.

8 Claims, No Drawings

TRANSPARENT BULLET-RESISTANT ACRYLIC SHEET

This application claims benefit, under U.S.C. §119 or §365 of PCT application PCT/US2006/10200 filed Mar. 21, 2006 and U.S Provisional application No. U.S. 60/670,438, filed Apr. 12, 2005.

FIELD OF THE INVENTION

The invention relates to a novel acrylic impact sheet having bullet-resistant properties. The bullet-resistant sheet is composed of a copolymer of methyl methacrylate and a $C_{2-18}$ alkyl methacrylate, plus impact modifiers. The impact modifiers can be refractive index matched with the polymer matrix for transparency, or mismatched for haze. The sheet provides very good bullet resisting performance, with better performance at the same thickness as current products, or the same performance at less thickness, thereby providing a product having better properties and/or less weight. The reduced weight of a bullet resistant acrylic sheet formulation will provide reduced raw material, transportation, and construction costs, while facilitating handling, fabrication and processing of parts. Bullet resistant transparent glazing is an especially useful application for the invention.

BACKGROUND OF THE INVENTION

Impact resistant glazing is used for protection from ballistics. In order for a material to be commercially accepted as being effective for ballistic glazing applications, the material must qualify as a "bullet-resistin" material by repeatedly passing an industry-wide certification test procedure. This test is administered by an independent, non-profit organization, Underwriter's Laboratories, Inc. (UL). Underwriter's Laboratories publishes test procedures and performance requirements for bullet-resisting glazing materials in UL-752 (Bullet-Resisting Equipment). There are several levels of increasingly more severe testing under the UL-752 standard, with Level I being the least severe, and increasing levels of severity generally requiring thicker glazing materials, or multilayer composites.

There are several polymeric glazing materials for which impact resistance is asserted, including polyurethanes as described in U.S. Pat. No. 5,962,617, and acrylic sheet as described in U.S. Pat. No. 4,505,972. Sheet thicknesses of at least 1.25 inches of the acrylic copolymer were required to pass a UL-752 (MPSA) or (HPSA) test.

Commercial bullet-resisting sheets are generally very expensive and heavy due to limitations of material strength and transparent requirements. The majority of transparent bullet-resisting sheets are either glass-laminates, glass clad-laminates or plastic-laminates, such as those described in US 2003/0190439 and U.S. Pat. No. 4,594,290. Laminated materials are more complicated and typically more costly to produce than monolithic sheet. The glass laminates are very heavy and tend to shatter when a bullet hits it. The glass clad laminates and the plastic laminates are also very expensive to produce but not quite as heavy to handle.

There is a need for lighter-weight impact-resistant glazing for use in bullet-resistant applications.

Surprisingly it has been found that a monolithic bullet-resistant sheet composed of a copolymer of methyl methacrylate and a $C_{2-18}$ alkyl methacrylate, containing core-shell impact modifiers provide very good bullet resisting performance. Sheet of the composition of the invention is capable of providing superior impact resistance at current thicknesses, or equal impact resistance at lower thicknesses. The lighter, thinner and stronger sheet compositions of the invention provide increased design flexibility and lower overall cost for bullet resisting applications.

SUMMARY OF THE INVENTION

It is an object of the invention to produce a monolithic acrylic sheet material of 1.2 inches or less, that will pass the UL 752 Level I standard.

It is a further objective of the invention to produce a monolithic acrylic sheet material of 1.25 inches or less, that will pass the UL 752 Level II standard for indoor use and 1.70 inches or less for outdoor use.

It is a further objective of the invention to produce a monolithic acrylic sheet material of 2.00 inches or less, which will pass UL 752 Level III and/or Level VI.

It is also an objective of the invention to produce a laminated polycarbonate/acrylic sheet less than 1.25 inches thick that meets UL 752 Level VI.

The objects of the invention have been met with an acrylic sheet composed of a copolymer of methyl methacrylate, and a $C_{2-18}$ alkyl methacrylate or acrylate, containing impact modifiers.

DETAILED DESCRIPTION OF THE INVENTION

The bullet-resistant sheet of the invention is composed of a copolymer of methyl methacrylate and a $C_{2-18}$ alkyl methacrylate, containing impact modifiers.

By "weatherable", as used herein is meant that articles made of the acrylic sheet will have no significant changes in yellowness index ($\Delta YI$) and Haze % ($\Delta Haze$) after exposure under an artificial Xenon Arc weathering device, reference test method ASTM-D1003 and ASTM E313. The ASTM stands for American Society for Testing and Materials.

By "transparent" as used herein is meant the polymeric article has a total white light transmission (TWLT) higher than 50% and haze% lower than 30%, measured by ASTM-D1003 and E313.

By "copolymer" as used herein is meant a polymer made from two or more monomers. This includes terpolymers and polymers made from multiple monomers.

The sheet matrix material could be any monolithic thermoplastic. A preferred thermoplastic is an acrylic. By "acrylic", as used herein is meant a homo-, or copolymer made primarily of acrylic and methacrylic monomers. The acrylic polymer may contain up to 5 weight percent of one or more ethylenically unsaturated non-(meth)acrylic monomers, including but not limited to styrene, alpha-methyl styrene, butadiene, vinyl acetate, vinylidene fluorides, vinylidene chlorides, vinyl sulfone, vinyl sulfides, and vinyl suloxides. A preferred acrylic polymer is composed of a major amount of methyl methacrylate monomer units of from 75 to 95 weight percent, and a minor amount of from 5 to 25 weight percent of one or more $C_{2-18}$ alkyl methacrylates or acrylates. In one embodiment, the matrix is composed of from 7-15% butyl methacrylate and 85-93% methyl methacrylate monomers. In another embodiment the matrix is composed of 80 to 93% methyl methacrylate, 7 to 20 percent butyl methacrylate, and from 0 to 5 percent by weight of styrene or alpha methyl styrene.

In a preferred embodiment, the acrylic sheet matrix is blended with from 3 to 40 and preferably from 5 to 25 percent by weight, of one or more impact modifiers. It is not required that the refractive index of the impact modifier(s) be matched with that of the acrylic matrix to obtain good impact resistance. However, in many applications it is desirable to have a transparent sheet with low haze. Matching the refractive index of the matrix to that of the impact modifier results in a transparent sheet, while a mis-match of refractive indices results in a hazy or translucent sheet.

In one embodiment it was found to be useful to use impact modifiers with particle sizes below about 150 nm when used in a bulk or cast polymerization process. It was also found that the degree of crosslinking in the rubber or elastomer layer affects the clarity and transparency of the final impact modified cast sheet.

Preferred impact modifiers are core-shell multi-layer polymers and block copolymers having at least one hard and at least one soft block. The core-shell (multi-layer) impact modifiers could have a soft (rubber or elastomer) core and a hard shell, a hard core covered with a soft elastomer-layer, and a hard shell, of other core-shell morphology known in the art. The rubber layers are composed of low glass transition (Tg) polymers, including, but not limited to, butyl acrylate (BA), ethylhexyl acrylate (EHA), butadiene (BD), butylacrylate/styrene, and many other combinations.

The preferred glass transition temperature (Tg) of the elastomeric layer should be below 25° C. The elastomeric or rubber layer is normally crosslinked by a multifunctional monomer for improved energy absorption. Crosslinking monomers suitable for use as the crosslinker in the core/shell impact modifier are well known to those skilled in the art, and are generally monomers copolymerizable with the monounsaturated monomer present, and having ethylenically multifunctional groups that have approximately equal reactivity. Examples include, but are not limited to, divinylbenzene, glycol of di- and trimethacrylates and acrylates, triol triacrylates, methacrylates, and allyl metliacrylates, etc. A grafting monomer is also used to enhance the interlayer grafting of impact modifiers and the matrix/modifier particle grafting. The grafting monomers can be any polyfunctional crosslinking monomers.

For soft core multi-layered impact modifies, the core ranges from 30 to 85 percent by weight of the impact modifier, and outer shells range from 15-70 weight percent. The crosslinker in the elastomeric layer ranges from 0 to 5.0%. The synthesis of core-shell impact modifiers is well known in the art, and there are many references, for example U.S. Pat. Nos. 3,793,402 , 3,808,180, 3,971,835, and 3,671,610, incorporated herein by reference. The refractive index of the modifier particles, and/or matrix polymer, can be matched against each other by using copolymerizable monomers with different refractive indices. Preferred monomers include, but are not limited to, styrene, alpha methylstyrene, and vinylidene fluoride monomers having unsaturated ethylenic group.

Other non-core/shell impact modifiers are also possible for use in this invention, where super transparency and clarity may not be required. For example butadiene rubber can be incorporated into an acrylic matrix to achieve high ballistic resistance property.

The sheet material of the present invention may be made by any method known in the art. This includes extrusion and cell cast polymerization methods. In one embodiment the acrylic sheet is made by a cell cast process. Cell-cast processes are known to produce polymers having a higher molecular weight than those produced by an extrusion process. In a cell-cast process, the polymerization of the matrix monomers occurs in the presence of the impact modifier. The impact modifier can be added into the monomer mixture as a neat powder, or the impact modifier may be encapsulated in a polymer matrix that dissolves in the monomer mixture to improve the ease of handing or processing of the impact modifier.

The composition of the invention provides improved bullet resistance performance and therefore allows for a reduction in the overall weight of bullet-resisting sheet. The thickness/weight reduction provides tremendous cost advantages for the end users in handling, fabrication, and construction. A thinner transparent bullet-resisting sheet provides the end users with a good option for their various bullet-resisting applications and possibly better optical properties (higher luminous transmission and lower haze).

Acrylic materials are scratch resistant, and don't require a coating, as is needed with polycarbonates and other thermoplastic materials. However, the composition of the invention may be coated with a hard surface coating layer, such as a crosslinked siloxane-based coating or other silane and fused silica coatings, for a better abrasion resistance. Bullet-resisting plastic glazing is commonly coated when designed for use in applications requiring the performance of Level II of the UL 752 standard.

Acrylic impact-resistant sheet of the present invention may also be used in its monolithic state or as a layer within a laminate structure for applications requiring UL-752 Level III and above performance.

EXAMPLES

The following examples are illustrative of the invention but are not intended to be exhaustive or to limit the invention to the precise form disclosed. Many other variations and modifications are possible in light of the specification and examples Example 1

(Sample ID SE3)

3400 parts of methyl methacrylate monomer, 600 parts of butyl methacrylate monomer, 500 parts of multilayer impact modifier which is composed of:
A) 35% hard core
B) 45% a crosslinked elastomeric layer
C) 20% outer shell
500 parts of acrylic copolymer (96/4 methyl methacrylate/ethyl acrylate), 60 parts of alpha methyl styrene, 6.5 parts of stearic acid, 0.125 parts of 2,2'-Azobisisobutyronitrile, 1.0 parts of t-butyl peracetate, and 0.5 parts of TINUVIN P, were added into a mixing tank equipped with an agitator and stirred for a few hours until all of the ingredients were dissolved, or fully suspended, to form a homogenous mixture. The monomer mixture is then added into a glass cell seared by a polyvinyl spacer. The glass cell was put into an oven or a water bath at 61° C. for 28 hours, 70° C. for 16 hours, 80° C. for 4 hours, and 125° C. for 2 hours. A clear and highly transparent impact modified acrylic sheet with about 1.0" thickness is obtained after heating. There are no defects on the sheet surface. The sheet sample is ready to be coated with a thin layer of siloxane abrasion resistance coating for better scratch resistance and for bullet resistance test. The YI, TWLT, and haze were measured by Macbeth Coloreye 7000 calorimeter and Gardner model haze gardplus according to the ASTM E-313 and ASTM D-1003 methods. The results are listed in the following table.

| | YI | Haze | TWLT |
|---|---|---|---|
| Unit | N/a | % | % |
| Results | 0.27 | 1.9 | 88.0 |

Example 2

3520 parts of methyl methacrylate monomer, 480 parts of butyl methacrylate monomer, 700 parts of multi layer impact modifier which is composed of:
A) 45% hard core and outer shell
B) 55%—crosslinked elastomeric layers
50 parts of alpha methyl styrene, 6.5 parts of stearic acid, 0.125 parts of 2,2'-Azobisisobutyronitrile, 1.0 parts of t-butyl peracetate, and 0.5 parts of TINUVIN P, were added into a mixing tank equipped with an agitator and stirred for a few hours until all of the ingredients were dissolved to form a homogenous mixture. The monomer mixture is then added into a glass cell seared by a polyvinyl spacer. The glass cell was put into an oven or a water bath at 61° C. for 32 hours, 70° C. for 16 hours, 80° C. for 4 hours, and 125° C. for 2 hours. A clear and highly transparent impact modified acrylic sheet with about 1.25" thickness is obtained after heating. The sheet sample is ready to be coated with a thin layer of siloxane abrasion resistance coating for better scratch resistance and for bullet resistance test.

Example 3

A 1" thick impact modified acrylic bullet resistant sheet can also be made through a sheet extrusion process. A copolymer of 17% butyl methacrylate and 83% methyl methacrylate can be produced through a suspension, CFSTR(Continuous flow stirring tank reaction), solution, or emulsion polymerization process. The molecular weight is controlled by the appropriate amount of chain transfer agent such that the final BMA/MMA copolymer resin can be melt-processed on typical melt processing equipment. The 30% of impact modifier with the same composition as in the example 1 and 70% of BMA/MMA copolymer resin made by a CFSTR process are compounded together by a twin-screw, Werner and Pfleiderer, compounding extruder, or a similar extruder, and pelletized into resin pellets. This impact modifier resin is then extruded into a 1" thick clear sheet through a sheet extruder. The impact modifier particles and BMA/MMA copolymer can also be compounded on a sheet extruder with a proper screw and extruded into a 1" thick sheet directly. The resulting sheet would be clear and highly transparent and ready for bullet resistant test. It may or may not also be coated.

Example 4

3400 parts of methyl methacrylate monomer, 600 parts of butyl methacrylate monomer, 1000 parts of pre-compounded impact modified resin which is composed of about 50/50 of multi-layered core/shell modifiers and acrylic copolymer (96/4 methyl methacrylate/ethyl acrylate), 60 parts of alpha methyl styrene, 6.5 parts of stearic acid, 0.125 parts of 2,2'-Azobisisobutyronitrile, 1.0 parts of t-butyl peracetate, and 0.5 parts of TINUVIN P, were added into a mixing tank equipped with an agitator and stirred for a few hours until all of the ingredients were dissolved to form a homogeneous mixture. The monomer mixture was then added into a glass cell seared by a polyvinyl spacer. The glass cell was put into an oven or a water bath at 61° C. for 32 hours, 70° C. for 16 hours, 80° C. for 6 hours, and 125° C. for 2 hours. A clear and highly transparent impact modified acrylic sheet with about 1.25" thickness is obtained after heating. There are no defects on the sheet surface. Thesheet sample is ready for bullet resistance test.

Example 5

Reference Standards and Procedures:
UL-752, Bullet resisting Equipment, 10th edition
Indoor, Non-metallic, protection level I (9 mm, 1175-1293 fps.)

Example 5A

Setup: Shot spacing: 3 shot on 4" triangle
Witness panel: 1/8" Corrugated cardboard
Obliquity: 0 degree
Backing material: NA

| Sample ID | Shot number | Average velocity (f/s) | Temperature (Sample-° F.) | Result |
|---|---|---|---|---|
| 1"-SB3 | 1 | 1275 | 55 | Pass |
| | 2 | 1252 | 55 | Pass |
| | 3 | 1272 | 55 | Pass |

Conditioning: Cold temperature (+55F) for Level I UL rating
Ammunition: 9 mm Luger, FMJ, 124 grams
Sample size: 12"×12"×0.967"
Average thickness: 0.967"
Sample weight: 6.08 lb.

Example 5B

Setup: Shot spacing: 2 shots spaced 1.5"
Witness panel: 1/8" Corrugated cardboard
Obliquity: 0 degree
Backing material: NA

| Sample ID | Shot number | Average velocity (f/s) | Temperature (Sample-° F.) | Result |
|---|---|---|---|---|
| 1"-SB3 | 1 | 1248 | 72 | Pass |
| | 2 | 1254 | 72 | Pass |

Conditioning: Cold temperature (+72F) for Level I UL rating
Ammunition: 9 mm Luger, FMJ, 124 grams
Sample size: 12"×12"×0.949"
Average thickness: 0.949"
Sample weight: 5.95 lb.

What is claimed is:
1. A monolithic sheet wherein the sheet is a transparent acrylic sheet having a thickness of from 0.75 to 2.00 inches, having a composition consisting of:
  a) from 75 to 95 weight of an acrylic copolymer having from 75 to 95 percent by weight of methylmethacrylate monomer units, from 5 to 25 percent by weight of one or more $C_{2-18}$ alkyl (meth)acrylate monomer units, and from 0 to 5 percent of other ethylenically unsaturated monomer units,
    wherein the total monomer units add up to 100 percent; and b) from 5 to 25 percent by weight of one or more core-shell impact modifiers having an average particle size of 150 nm or less, and wherein a monolithic polymer sheet of said composition, having a thickness of 1.2 inches or less, passes the UL Standard 752 Level I test, and wherein the polymer sheet is transparent with a TWLT of higher than 50% and haze of less than 30% measured by ASTM-D1003 and ASTM E313.

2. The monolithic sheet of claim 1 wherein the sheet is a transparent acrylic sheet consisting of:
   a) from 75 to 95 weight of an acrylic copolymer having from 80 to 92 percent by weight of methylmethacrylate monomer units, from 7 to 20 percent by weight of butyl methacrylate monomer units, and from 0 to 5 percent of other ethylenically unsaturated monomer units wherein the total monomer units add up to 100 percent; and
   b) from 5 to 25 percent by weight of one or more core-shell impact modifiers, having an average particle size of 150 nm or less, and wherein the polymer sheet is transparent with a TWLT of higher than 50% and a haze of less than 30% measured by ASTM-D 1003 and ASTM E313.

3. The monolithic sheet of claim 1, wherein said sheet is produced by a cell-cast process.

4. The monolithic sheet of claim 1, wherein said sheet is produced by an extrusion process.

5. The monolithic sheet of claim 1, wherein said sheet has a thickness of from 0.75 to 1.5 inches.

6. The monolithic polymer sheet of claim 1 having a thickness of 1.25 inches or less, capable of passing the UL Standard 752 Level II and/or Level III test.

7. The monolithic polymer sheet of claim 1 having a thickness of 2.00 inches or less, capable of passing UL 752 Level III and/or Level VI.

8. The monolithic polymer sheet of claim 1 having a thickness of about 1.0 inches, capable of passing the UL Standard 752 Level I test.

* * * * *